United States Patent [19]

Marks

[11] Patent Number: 4,496,087

[45] Date of Patent: Jan. 29, 1985

[54] ICE DISPENSER CONTROL

[75] Inventor: James R. Marks, Lincoln Township, Berrien County, Mich.

[73] Assignee: King-Seeley Thermos Co., Albert Lea, Minn.

[21] Appl. No.: 535,554

[22] Filed: Sep. 27, 1983

Related U.S. Application Data

[63] Continuation of Ser. No. 234,170, Feb. 13, 1981, abandoned.

[51] Int. Cl.³ .............................................. G01F 11/46
[52] U.S. Cl. ...................................... 222/638; 141/361
[58] Field of Search ...................... 222/640, 641, 638; 141/360, 361, 362; 366/601; 62/344

[56] References Cited

U.S. PATENT DOCUMENTS

| | | |
|---|---|---|
| 307,629 | 11/1884 | Church . |
| 1,517,923 | 12/1924 | Sylvester . |
| 1,669,624 | 5/1928 | Moore et al. . |
| 3,181,739 | 5/1965 | Dye . |
| 3,227,313 | 1/1966 | Morena . |
| 3,516,579 | 6/1970 | Bromarker . |
| 3,651,656 | 3/1972 | Esser et al. ........................ 62/344 X |
| 4,202,387 | 5/1980 | Upton .................................. 141/360 |
| 4,226,269 | 10/1980 | Carr et al. ............................ 141/361 |
| 4,228,934 | 10/1980 | Carr ..................................... 222/412 |
| 4,252,252 | 2/1981 | Gross et al. ..................... 222/641 X |

Primary Examiner—F. J. Bartuska
Attorney, Agent, or Firm—Harness, Dickey & Pierce

[57] ABSTRACT

An ice dispenser control wherein a plurality of solenoids are selectively operated by switches engaged by cups of different sizes placed in a dispensing space of the ice dispenser. The solenoids cause a delivery passage of the ice maker to be closed at a selected level thereof by a divider while concurrently a closure normally closing the delivery end of the delivery passage is removed therefrom so as to permit ice bodies in the passage between the delivery end and the actuated divider to be dispensed to the cup in the dispensing space. The control causes an agitator in the ice storage bin to be operated for a preselected period of time each time ice is delivered from the delivery passage. Additionally, the control is arranged to cause agitation of the ice in the ice storage bin whenever no dispensing of ice is effected for a preselected long period of time, thereby to prevent conglomeration of the ice bodies in the storage bin. The control is arranged to provide the timing operations automatically through a clock and timer devices of the control circuitry.

2 Claims, 4 Drawing Figures

ICE DISPENSER CONTROL

This application is a continuation of application Ser. No. 234,170, filed 2/13/81 now abandoned.

BACKGROUND OF THE INVENTION

1. Field of the Invention

This invention relates to ice body dispensers and in particular to controls for use therein.

2. Description of the Prior Art

In one form of ice dispenser, ice bodies are delivered from a storage receptacle through a downwardly extending delivery passage, having a lower delivery end opening to a subjacent delivery space in which a cup for receiving the ice may be placed. The lower delivery end of the delivery passage may be closed between ice body deliveries so as to permit the passage to be refilled with ice bodies from the storage space.

The dispenser controls the amount of ice bodies dispensed by causing the insertion of a forked element across the delivery passage at a preselected position spaced above the delivery end. Upon insertion of the fork, the closure normally closing the lower end is removed therefrom, permitting the ice bodies below the fork to fall downwardly from the delivery passage into the subjacent cup.

Actuation of the mechanism may be controlled by the cup engaging a suitable sensing device controlling an electric switch for operating a solenoid to effect the desired movement of the fork and closure means.

Such a dispenser may be arranged to provide different quantities of ice bodies as a function of the placement of any one of a number different size cups in the delivery space or station. Thus, a plurality of forks may be selectively inserted at different levels in the delivery passage through an ice delivery tube portion of the dispenser so as to provide a different amount of ice bodies below the fork delivered upon removal of the closure from the delivery end. The different size cups are arranged to operate different sensing elements so as to cause the corresponding proper fork to be inserted, thereby to deliver to the cup the proper amount of ice from the delivery passage, depending on the size of the cup.

A problem has arisen in the prior art devices of this type in that such devices may be utilized in installations, such as fast food installations, wherein the ice bodies may be retained in the storage space for relatively long periods of time without any dispensing of ice bodies so that conglomeration of the ice bodies in the storage space may occur, tending to interfere with proper operation of the dispenser.

SUMMARY OF THE INVENTION

The present invention comprehends an improved ice body dispenser having means for automatically preventing conglomeration of the ice bodies in the storage space, notwithstanding nondelivery of ice bodies over protracted periods of time.

More specifically, the invention comprehends the provision of such an ice body dispenser wherein means are provided for stirring the ice bodies in the storage means automatically as an incident of each ice body delivery.

The invention further comprehends the provision of means for effecting stirring of the ice bodies in the storage means after a preselected period of time following a dispensing operation for the purpose of positively refilling the ice delivery tube portion of the dispenser.

The control for effecting the desirable ice body stirring is an integrated circuit control which may include means for effecting the stirring operation for a preselected period of time. In the illustrated embodiment, the control is arranged to effect such stirring for a period of approximately 10 seconds.

In the illustrated embodiment, the control is arranged to effect a stirring of the ice bodies after a protracted period of time during which no ice is dispensed, such as approximately one hour.

In the illustrated embodiment, the stirring of the ice bodies following the preselected protracted period of time may be for a relatively short period of time, such as 10 seconds.

The control of the present invention is a solid state control which is extremely simple and economical, and which utilizes means for sensing the operation of the delivery passage fork means solenoids to effect the automatic timing of the stirring operations.

The control is arranged so as to effect the stirring operation following the energization of any of the solenoids providing any of the preselected different quantities of ice bodies from the delivery passage.

Thus, the ice dispenser control of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
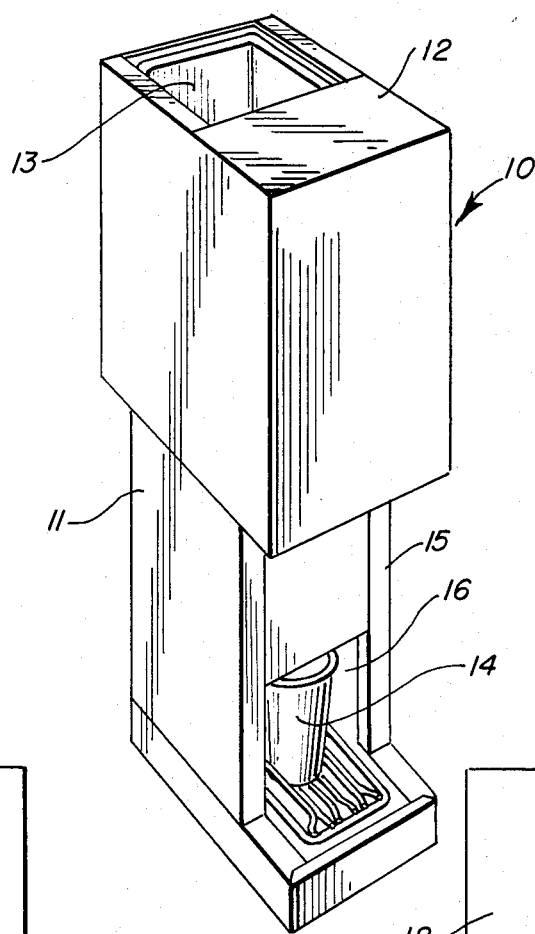
FIG. 1 is a perspective view of an ice dispenser having control means embodying the invention.

In the illustrative embodiment of the invention as disclosed in the drawing, an ice dispenser generally designated 10 includes a housing 11 having an upper portion 12 defining an ice body storage bin 13 in which ice bodies are stored for transfer in preselected small quantities to receiving elements, such as cups 14. A lower portion 15 of the housing defines a dispensing space or station 16 in which the cups 14 are placed to receive ice bodies from the storage bin in the dispensing operation.

Figure 3:
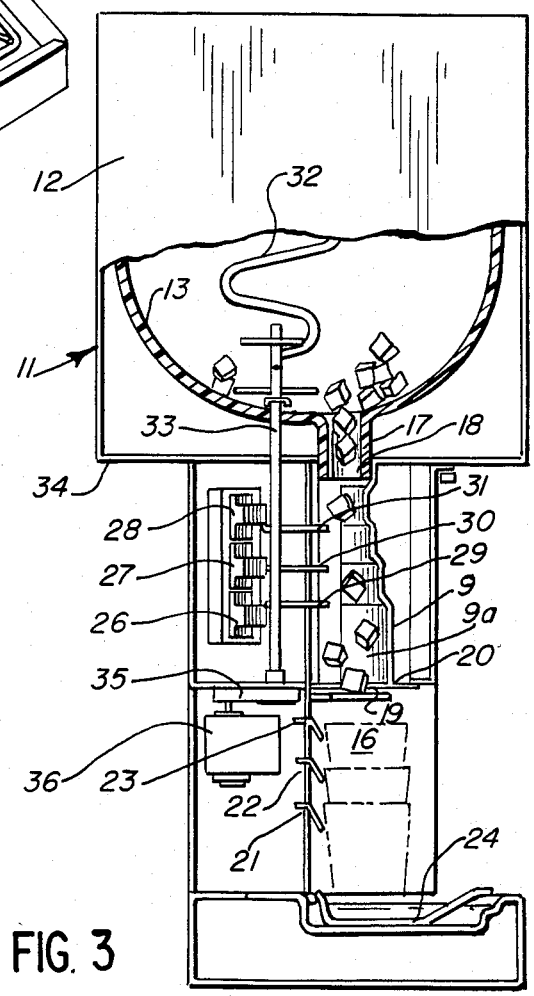
FIG. 3 is a fragmentary vertical section thereof.

As shown in FIG. 3, an ice body delivery duct 17 defines a downwardly opening ice delivery passage 18 leading downwardly from the lower end of the storage bin 13 through an ice delivery tube 9, to a lower delivery end 19 of the ice delivery tube 9, which is normally closed by a closure 20. Ice bodies are delivered from the storage bin downwardly through the delivery passage 18 so as to normally fill the ice delivery tube passage 9a above the closure 20 prior to a dispensing operation.

Figure 2:
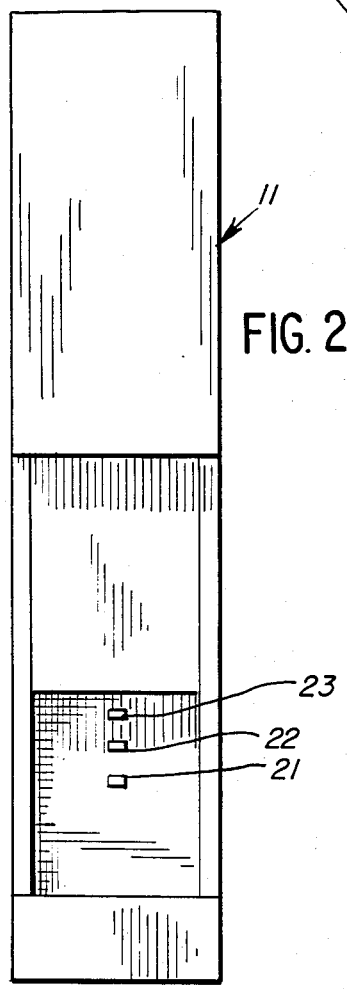
FIG. 2 is a front elevation thereof.

As seen in FIGS. 2 and 3, a plurality of sensing devices 21, 22 and 23 are provided at the rear of dispensing space 16 to be engaged selectively by three different size cups placed on a support 24 at the bottom of space 16. Thus, a small cup placed on support 24 engages sensing device 21, a medium size cup placed on support 24 engages sensing device 22, and a large size cup placed on support 24 engages sensing device 23 to activate the dispensing control circuit generally designated 25 illustrated in schematic form in FIG. 4.

Figure 4:
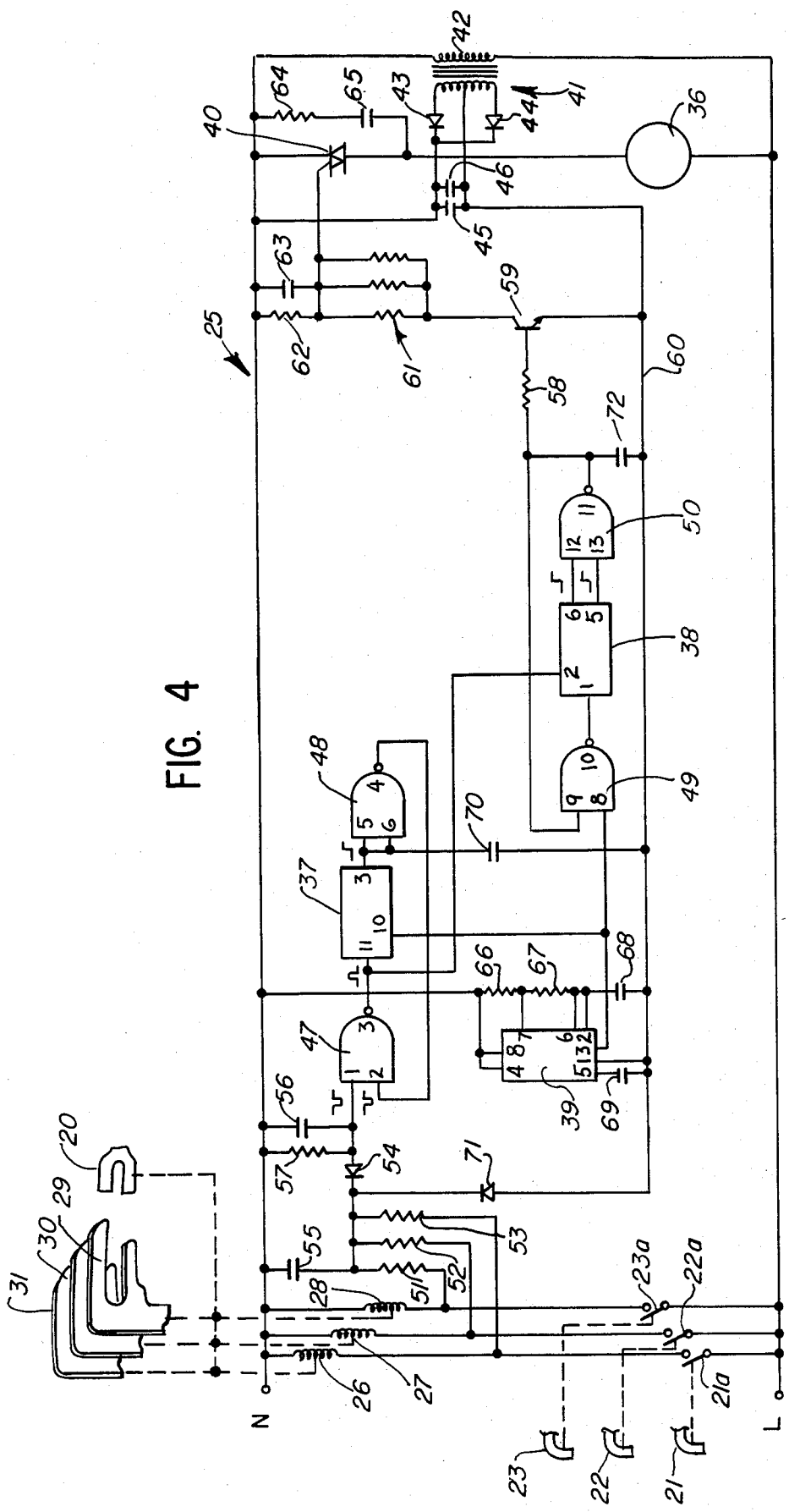
FIG. 4 is a schematic wiring diagram of the control.

Briefly, sensing device 21 comprises a switch actuator connected to a single-pole, single throw cup switch 21a, as shown in FIG. 4, connected in series with a first solenoid 26, sensing device 22 comprises a switch actuator connected to a single-pole, single throw cup switch 22a connected with a second solenoid 27, and sensing device 23 comprises a switch actuator connected to a single-pole, single throw cup switch 23a connected in series with a third solenoid 28. Thus, as shown in FIG. 4, the switches selectively energize the selected solenoid between the power supply leads L1 and N as a result of the closing of the selected switch by the placement of a corresponding size cup in the dispensing space 16. The solenoids, respectively actuate three fork devices 29, 30 and 31, so as to selectively move one of the fork devices into ice delivery tube 9 to extend across the ice delivery passage 9a thereof at different preselected levels above the delivery end 19. The control is arranged to concurrently cause the movement of closure 20 away from closing position across lower end 19 of the ice delivery tube upon the closing of one of the switches 21a, 22a, or 23a, and the insertion of the selected fork 29, 30 or 31 into the ice delivery tube flow passage so as to permit all ice bodies below the level of the fork to fall downwardly through the delivery end 19 of the delivery passage into the cup 14 disposed in dispensing space 16. Thus, the control automatically provides a proper amount of ice bodies to the cup placed in dispensing space 14 depending upon the size of the cup.

The present invention is concerned with the problem of preventing conglomeration of the ice bodies in storage bin 13, which may occur as a result of the ice bodies standing therein for a protracted period of time wherein some melting may occur, causing conglomeration or fusing of the ice bodies together and preventing free movement of the ice bodies down into the delivery passage 18 in effecting the desired automatic refilling of the ice delivery tube 9 following each dispensing operation.

As shown in FIG. 3, the invention comprehends the provision of a stirrer 32 disposed in the lower portion of the collecting bin 13 and connected by a shaft 33 extending downwardly through a bottom wall 34 of the housing 11 to a drive 35 driven by an electric motor 36. Control 25 is arranged to cause energization of electric motor 36 each time one of the solenoids 26, 27 or 28 is energized so as to provide an automatic stirring of the ice bodies in the storage bin 13 for facilitating refilling of the ice delivery passages 18 and 9a at that time. Control 25 further includes means for energizing electric motor 36 at the end of a period of time during which no ice body dispensing operation is effected. Thus, should the ice dispenser remain inactive for a relatively long period of time, such as one hour, the control automatically causes a stirring of the ice bodies in the storage bin 13 even though no dispensing operation has been effected with its comcomitant stirring cycle.

Referring now more specifically to FIG. 4, the control circuit 25 is best understood with reference to the schematic wiring diagram thereof. As shown, the control includes a 60-minute (approximate) integrated circuit timer 37 and a 10-second (approximate) integrated circuit timer 38. Timers 37 and 38 comprise conventional digital timers. A conventional clock in the form of an analog timer 39 is provided for providing suitable clock pulses to the timers 37 and 38 in carrying out the desired timing operations of the control.

Stirrer motor 36 is controlled by means of a conventional triac 40 to provide the desired energization of the motor in effecting the agitation of ice bodies in the storage bin, as discussed above. The control includes a power supply portion generally designated 41 including a transformer 42, suitable diodes 43 and 44 and filter capacitors 45 and 46. Transformer 42 comprises a 20-volt centertapped transformer.

The control circuit 25 includes logic elements comprising a pair of NAND gates 47 and 48 which are connected to the timer 37 and a pair of NAND gates 49 and 50 which are connected to the timer 38, as shown. Resistors 51, 52 and 53 are connected in series with switches 21, 22 and 23, respectively, through a diode 54 to one input of NAND gate 47. A capacitor 55 is connected between diode 54 and power supply lead N and a capacitor 56 and resistor 57 are connected in parallel between diode 54 and the input to NAND gate 47.

The output of NAND gate 48 is connected to the second input of NAND gate 47 and the output of NAND gate 47 is connected both to the timer 37 and timer 38.

The output of NAND gate 50 is connected through a resistor 58 to the base of an NPN transistor 59 having its emitter connected to the DC power supply lead 60. The collector of the transistor 59 is connected through a parallel resistor arrangement 61 to the gate of the triac 40 and the triac gate is connected through its parallel arrangement of a resistor 62 and capacitor 62 to the power supply lead N. A series connection of a resistor 64 and a capacitor 65 is connected in parallel with the triac.

Clock 39 is connected across a series connection of a resistor 66, resistor 67, and capacitor 68 to power supply lead 60, and through a capacitor 69 to power supply lead 60. A capacitor 70 is connected between the output of timer 37 and power supply lead 60.

Lead 60 is connected to diode 54 through a diode 71 and the output of NAND gate 50 is connected to power supply lead 60 through a capacitor 72.

In one illustrative embodiment, the parameters and specifications of the circuit components were as follows:

| | |
|---|---|
| Resistor 51, 52, 53 | 1 M OHM |
| Resistor 57 | 470K OHM |
| Resistor 66 | 1 M OHM |
| Resistor 67 | 499K OHM |
| Resistor 62 | 33 OHM |
| Resistor 61 | 8.2K OHM |
| Resistor 64 | 470 OHM |
| Resistor 58 | 150 OHM |
| Capacitor 55 | .001 MFD |
| Capacitor 63 | .1 MFD |
| Capacitor 56 | .001 MFD |
| Capacitors 68, 45 | .01 MFD |
| Capacitor 72 | .022 MFD |
| Capacitor 69 | .33 MFD |
| Capacitors 65, 70 | .1 MFD |
| Capacitor 46 | 1000 MFD |
| Timer 37 | CD4020BE |
| Timer 38 | CD4024BE |
| Timer 39 | NE555 |

The operation of control 25 is extremely simple. Thus, when any one of the cup switches 21a, 22a, or 23a is closed by the placement of a cup in the dispensing space, not only is the corresponding solenoid 26, 27 or 28 energized, but also current is provided to the selected resistor 51, 52 or 53 so as to turn the input to NAND gate 47 therefrom low, thereby providing a signal from the output of NAND gate 47 to the timer 38, thereby causing transistor 59 to control the gate of triac 40 suitably to cause energization of the stirrer motor 36 in series with triac 40 for the timing period of 10 seconds controlled by timer 38 without need for a separate closure switch operation as required in the devices of the prior art. The removal of the cup causes the previously closed cup switch to open, and the timer 38 begins counting out a 10 second time interval and the stirrer motor continues to run for that time interval.

At the same time, timer 37 is reset so as to begin again the timing count of approximately one hour of the timer 37.

In the event timer 37 is not reset within one hour as a result of closing a cup switch 21a, 22a, or 23a, timer 37 provides an output signal to NAND gate 48 suitable to provide an output signal therefrom to the input of NAND gate 47, thereby causing the output of NAND gate 47 to cause operation of timer 38 suitably to energize the stirrer motor 36 for a 10-second period of time. Such automatic stirring of the ice bodies in the ice bin occurs at the end of each one-hour timing cycle of timer 37 in the event that no dispensing of ice bodies has taken place during the preceding hour. Thus, notwithstanding the inactivity of the dispenser, a stirring of the ice bodies is automatically effected at preselected intervals to assure the proper filling of the delivery passage.

Where a high usage rate of the dispenser occurs, the stirring of the ice bodies in the ice bin as a result of each dispensing operation further assures a proper desired delivery of the ice bodies to the delivery passage for metered delivery to the receptacle cup placed in the delivery space. As will be obvious to those skilled in the art, the time periods set forth relative to the illustrative embodiment are exemplary only and, thus, may be varied to suit as desired within the scope of the invention.

The foregoing disclosure of specific embodiments is illustrative of the broad inventive concepts comprehended by the invention.

I claim:

1. In an ice dispenser having storage means for storing ice bodies, means defining a delivery passage for conducting ice bodies from the storage means through a delivery end of the passage to a delivery space, closure means for selectively closing the passage at said delivery end for retaining ice bodies in said passage, and a plurality of divider means operable for selectively (a) permitting said passage to be undivided or (b) dividing said passage into different volume portions extending from said delivery end to permit different quantities of ice bodies to be selectively delivered through said delivery end concurrently with said closure means being disposed to open said passage at said delivery end, the improvement comprising:

stirring means for stirring ice bodies in said storage means; and control circuit means for operating said stirring means for a first preselected period of time in response to the actuation of any of said divider means, and for operating said stirring means for said first preselected period of time in response to the passage of a second preselected period of time since the last actuation of one of said divider means, said stirring means being operated in response to said passage of said second preselected period of time only if none of said divider means has been actuated during said second period of time, said second period of time being substantially greater than said first period of time;

said control circuit means including first integrated circuit timer means for determining said first period of time, second integrated circuit timer means for determining said second period of time, clock means for providing clock pulses to said first and second timer means, logic gating means for causing said second timer means to be reset and restarted in response to the actuation of any of said divider means and for causing said first timer means to generate an output control signal for said first period of time either in response to the actuation of any of said divider means or in response to a completion of said second period of time without any of said divider means being actuated, and power supply controlling means for operating said stirring means in response to said output control signal from said first timer means.

2. The ice dispenser of claim 1 wherein said first period of time is less than approximately one minute.

* * * * *